United States Patent
Gotoh

(10) Patent No.: US 9,230,487 B2
(45) Date of Patent: Jan. 5, 2016

(54) DISPLAY DEVICE AND TELEVISION RECEIVER

(71) Applicant: Sharp Kabushiki Kaisha, Osaka (JP)

(72) Inventor: Toshiyuki Gotoh, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/382,652

(22) PCT Filed: Feb. 25, 2013

(86) PCT No.: PCT/JP2013/054688
§ 371 (c)(1),
(2) Date: Sep. 3, 2014

(87) PCT Pub. No.: WO2013/133061
PCT Pub. Date: Sep. 12, 2013

(65) Prior Publication Data
US 2015/0055025 A1    Feb. 26, 2015

(30) Foreign Application Priority Data
Mar. 5, 2012  (JP) ................................. 2012-048372

(51) Int. Cl.
*H04N 5/57* (2006.01)
*H04N 9/69* (2006.01)
(Continued)

(52) U.S. Cl.
CPC ............ *G09G 3/3406* (2013.01); *G09G 3/2003* (2013.01); *G09G 3/2007* (2013.01);
(Continued)

(58) Field of Classification Search
CPC ......... H04N 5/20; H04N 5/7408; H04N 5/57; H04N 9/69; G09G 3/3426; G09G 2320/066; G09G 2320/0626; G09G 2320/0666; G09G 3/3406; G09G 3/2003; G09G 2320/0276; G09G 2320/062; G09G 2320/0673; G09G 2320/0686; G09G 2320/08; G09G 3/2007; G09G 3/36; G02F 2001/133601
USPC ................. 348/790, 566, 671, 687, 674, 675; 345/629, 690, 77, 617, 89, 694
IPC ..................................... H04N 5/57, 9/69, 5/445
See application file for complete search history.

(56) References Cited

U.S. PATENT DOCUMENTS

| 2010/0265167 A1 | 10/2010 | Kinoshita |
| 2011/0032283 A1* | 2/2011 | Baek .................... G09G 3/3413 345/690 |

(Continued)

FOREIGN PATENT DOCUMENTS

| JP | 2000-330542 A | 11/2000 |
| JP | 2006-126528 A | 5/2006 |

(Continued)

OTHER PUBLICATIONS

International Search Report for corresponding International Application No. PCT/JP2013/054688 mailed Mar. 26, 2013.

*Primary Examiner* — Sherrie Hsia
(74) *Attorney, Agent, or Firm* — Renner, Otto, Boisselle & Sklar, LLP

(57) ABSTRACT

A display device that can adjust brightness of each of a plurality of regions of an image by performing local dimming executes local dimming in a case of displaying a multi-color image (color image), and does not execute local dimming in a case of displaying a grayscale image. Moreover, in a case of displaying a mixed image of a multi-color image and a grayscale image, the display device does not execute local dimming in regions including a grayscale image among a plurality of regions of an image. Displaying a multi-color image at high contrast and displaying a grayscale image at high tone reproduction are both achieved.

9 Claims, 7 Drawing Sheets

(51) Int. Cl.
*G09G 3/34* (2006.01)
*G09G 3/20* (2006.01)
*G09G 3/36* (2006.01)
*H04N 5/74* (2006.01)
*H04N 5/20* (2006.01)
*G02F 1/1335* (2006.01)

(52) U.S. Cl.
CPC ............... *G09G3/3426* (2013.01); *G09G 3/36* (2013.01); *H04N 5/20* (2013.01); *H04N 5/7408* (2013.01); *G02F 2001/133601* (2013.01); *G09G 2320/0276* (2013.01); *G09G 2320/062* (2013.01); *G09G 2320/066* (2013.01); *G09G 2320/0666* (2013.01); *G09G 2320/0673* (2013.01); *G09G 2320/0686* (2013.01); *G09G 2380/08* (2013.01)

(56) References Cited

U.S. PATENT DOCUMENTS

2014/0063078 A1\* 3/2014 Choi .................. G09G 3/22
                                              345/690
2014/0176469 A1\* 6/2014 Lim ................... G06F 3/04847
                                              345/173

FOREIGN PATENT DOCUMENTS

JP  2010-257603      11/2010
JP  2011-009564 A    1/2011

\* cited by examiner

F I G. 2
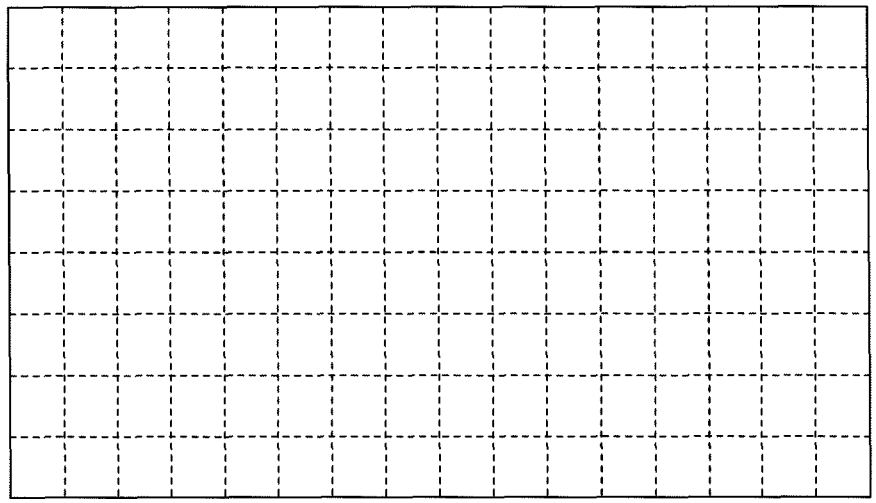

F I G. 4
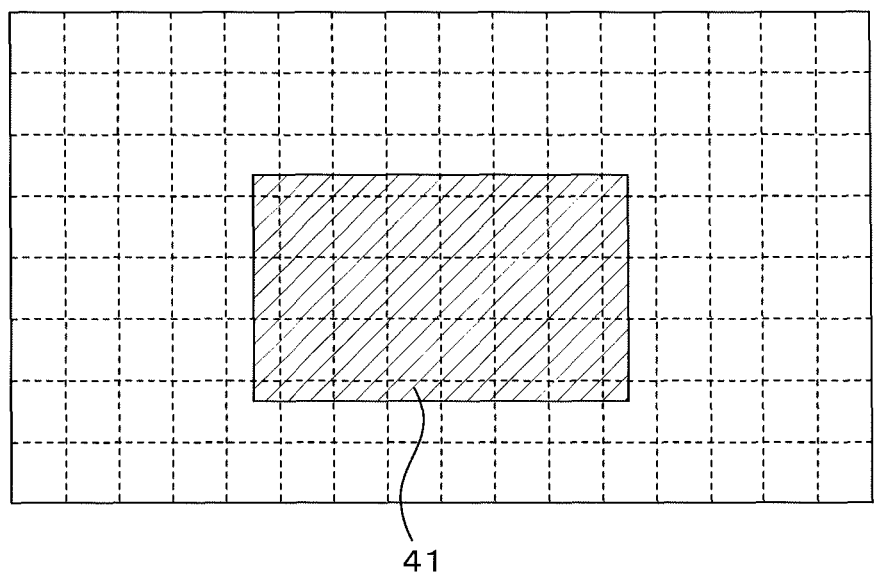
41

F I G. 5
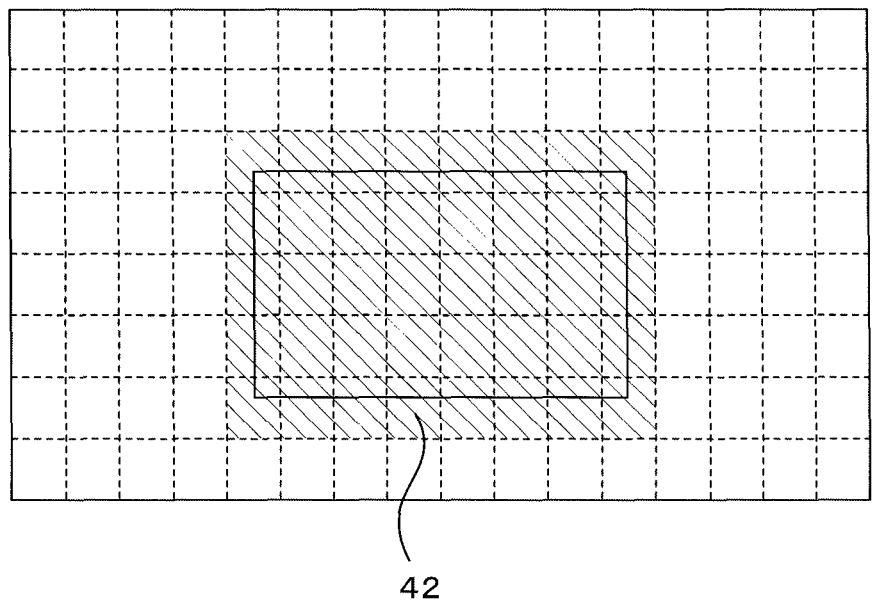
42

F I G. 6
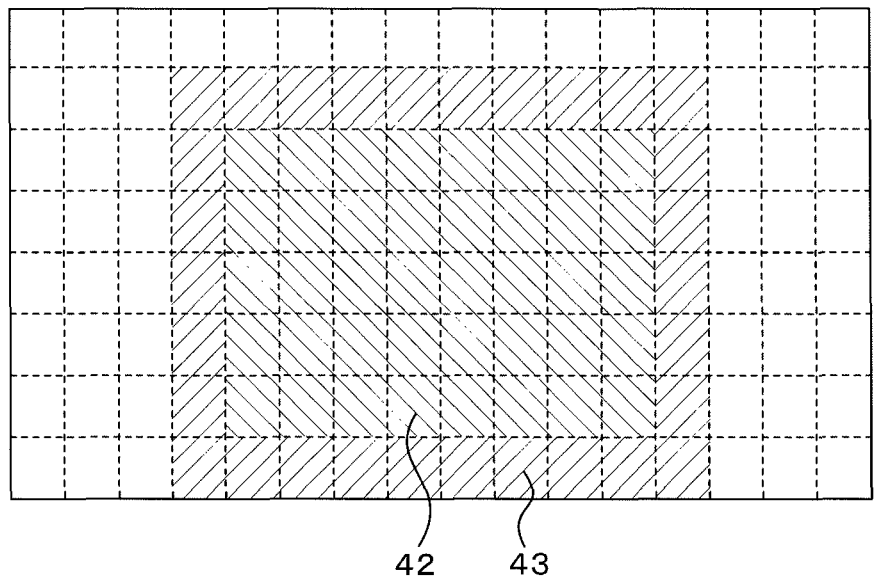
42  43

F I G. 7
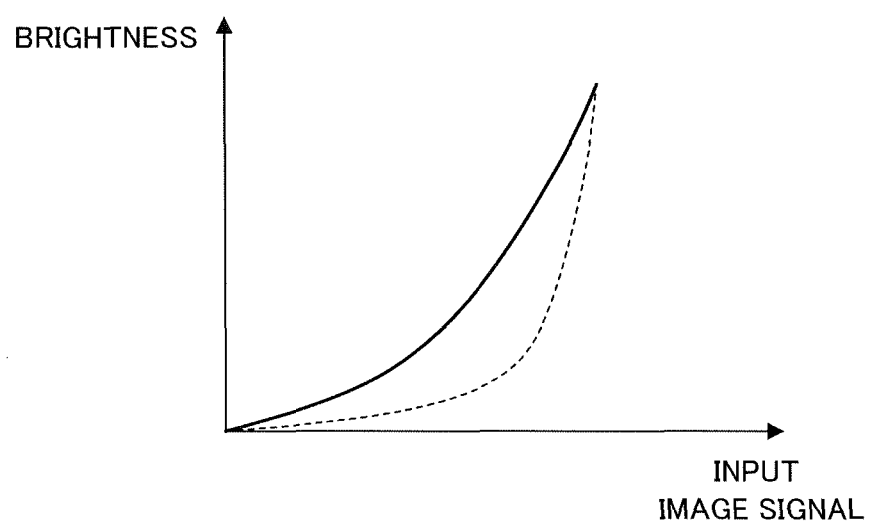

DISPLAY DEVICE AND TELEVISION RECEIVER

This application is the national phase under 35 U.S.C. §371 of PCT International Application No. PCT/JP2013/054688 which has an International filing date of Feb. 25, 2013 and designated the United States of America.

BACKGROUND

1. Technical Field

The present invention relates to a display device that displays an image using a direct-type backlight and to a television receiver.

2. Description of Related Art

A liquid crystal display device is widely used for computer displays, television image receivers, and information displays which display various information, and the like. The liquid crystal display device has: a display panel using liquid crystal; and a backlight illuminating this display panel from the back side thereof. Some of the liquid crystal display devices use a direct-type backlight in which light sources are arranged on the back side of a display panel. In particular, the liquid crystal display devices having a backlight in which a plurality of light sources such as LEDs (light emitting diodes) are arranged on the back side of the display panel can execute local dimming to improve image quality. Local dimming is the technique for individually controlling luminance of each light source in a backlight in accordance with an image to be displayed. Local dimming can partially change brightness of the image to be displayed and improve the contrast of the image. An example of the local dimming technique is disclosed in Japanese Patent Application Laid-Open No. 2010-257603.

SUMMARY OF THE INVENTION

Nowadays, display devices have opportunities to display multi-color images and monochromatic (black-and-white) grayscale images. Grayscale images, in which tone reproduction can be recognized higher than in multi-color images, are used in the field where high tone reproduction is necessary. For example, grayscale images are often used for medical images such as X-ray photographs, echo images, and the like. Also, display devices have opportunities to display grayscale images such as monochrome movie films. Since the number of light sources included in a backlight is generally less than the number of pixels included in an image displayed by a display device, a plurality of pixels are included in a minimum unit of the image for which brightness can be changed by performing local dimming. For this reason, when local dimming is performed to enhance the contrast in a part of an image, a phenomenon called halo, which changes brightness in the area larger than the area to be enhanced in its contrast in the image, occurs. In multi-color images, the occurrence of halos has a small influence on the image quality, whereas in grayscale images, high tone reproduction of the images may be deteriorated in the parts where halos occur. For example, when halos occur in medical images, fine tone reproduction between a highlight part and a shadow part cannot be expressed, thus accurate medical diagnosis may be difficult.

The present invention has been achieved in view of the above circumstances. An object of the invention is to provide a display device that can maintain high tone reproduction of grayscale images while having the local dimming function, and a television receiver.

A display device according to the present invention, capable of displaying a color image and a grayscale image, is characterized by comprising: a display device capable of displaying a color image and a grayscale image, comprising: an adjusting unit configured to adjust brightness of each of a plurality of regions of an image by performing local dimming; and a first determining unit configured to determine whether an image to be displayed is a color image or a grayscale image, wherein the adjusting unit adjusts brightness of the image by performing local dimming in a case where the first determining unit determines that the image to be displayed is a color image, and does not adjust brightness of the image by performing local dimming in a case where the first determining unit determines that the image to be displayed is a grayscale image.

The display device according to the present invention is characterized by further comprising: a second determining unit configured to determine whether or not the image to be displayed is a mixed image of a color image and a grayscale image; and a first specifying unit configured to specify a region including the grayscale image among the plurality of regions in a case where the second determining unit determines that the image to be displayed is the mixed image, wherein the adjusting unit does not adjust brightness of the region specified by the first specifying unit by performing local dimming.

The display device according to the present invention is characterized by further comprising a second specifying unit configured to specify, among regions not including the grayscale image, a region located within a predetermined range from the region including the grayscale image, wherein the adjusting unit does not adjust brightness of the region specified by the second specifying unit by performing local dimming.

The display device according to the present invention is characterized by further comprising: a first gamma correction unit configured to perform gamma correction on the color image with a predetermined gamma characteristic for a color image; and a second gamma correction unit configured to perform gamma correction on the grayscale image with a gamma characteristic that conforms to the Grayscale Standard Display Function defined in the DICOM standards.

The display device according to the present invention is characterized by further comprising a third gamma correction unit configured to perform gamma correction on color pixels included in the mixed image with a predetermined gamma characteristic for a color image, and to perform gamma correction on monochrome pixels included in the mixed image with a gamma characteristic that conforms to the Grayscale Standard Display Function defined in the DICOM standards.

A television receiver according to the present invention is characterized by comprising: the display device according to the present invention; and a receiving section receiving a television broadcast, wherein the display device displays an image based on the television broadcast received by the receiving section.

In the present invention, the display device capable of local dimming executes local dimming in the case of displaying a multi-color image and does not execute local dimming in the case of displaying a grayscale image.

In the present invention, the display device does not execute local dimming in a region including a grayscale image among a mixed image in the case of displaying the mixed image of a multi-color image and the grayscale image.

In the present invention, the display device also does not execute local dimming in a proximate region proximal to a region including the grayscale image in the mixed image.

Moreover, the display device performs gamma correction on the multi-color image with the gamma characteristic for multi-color images, while performing gamma correction on the grayscale image with the gamma characteristic that conforms with the Grayscale Standard Display Function in order that medical images can be displayed.

In the present invention, excellent advantages are achieved such as displaying multi-color images at high contrast by performing local dimming while displaying grayscale images at high tone reproduction without deterioration of image quality due to halo caused by performing local dimming.

The above and further objects and features of the invention will more fully be apparent from the following detailed description with accompanying drawings.

BRIEF DESCRIPTION OF THE SEVERAL VIEWS OF THE DRAWINGS

FIG. 2 is a schematic diagram illustrating a plurality of regions into which an image is divided;
FIG. 4 is a schematic diagram illustrating an example of an area of a grayscale image;
FIG. 5 is a schematic diagram illustrating an example of the regions including the grayscale image;
FIG. 6 is a schematic diagram illustrating an example of proximate regions;
and
FIG. 7 is a characteristic chart schematically illustrating an example of a gamma characteristic.

DETAILED DESCRIPTION

The present invention will be described below in detail with reference to the drawings illustrating the embodiment thereof.

Figure 1:
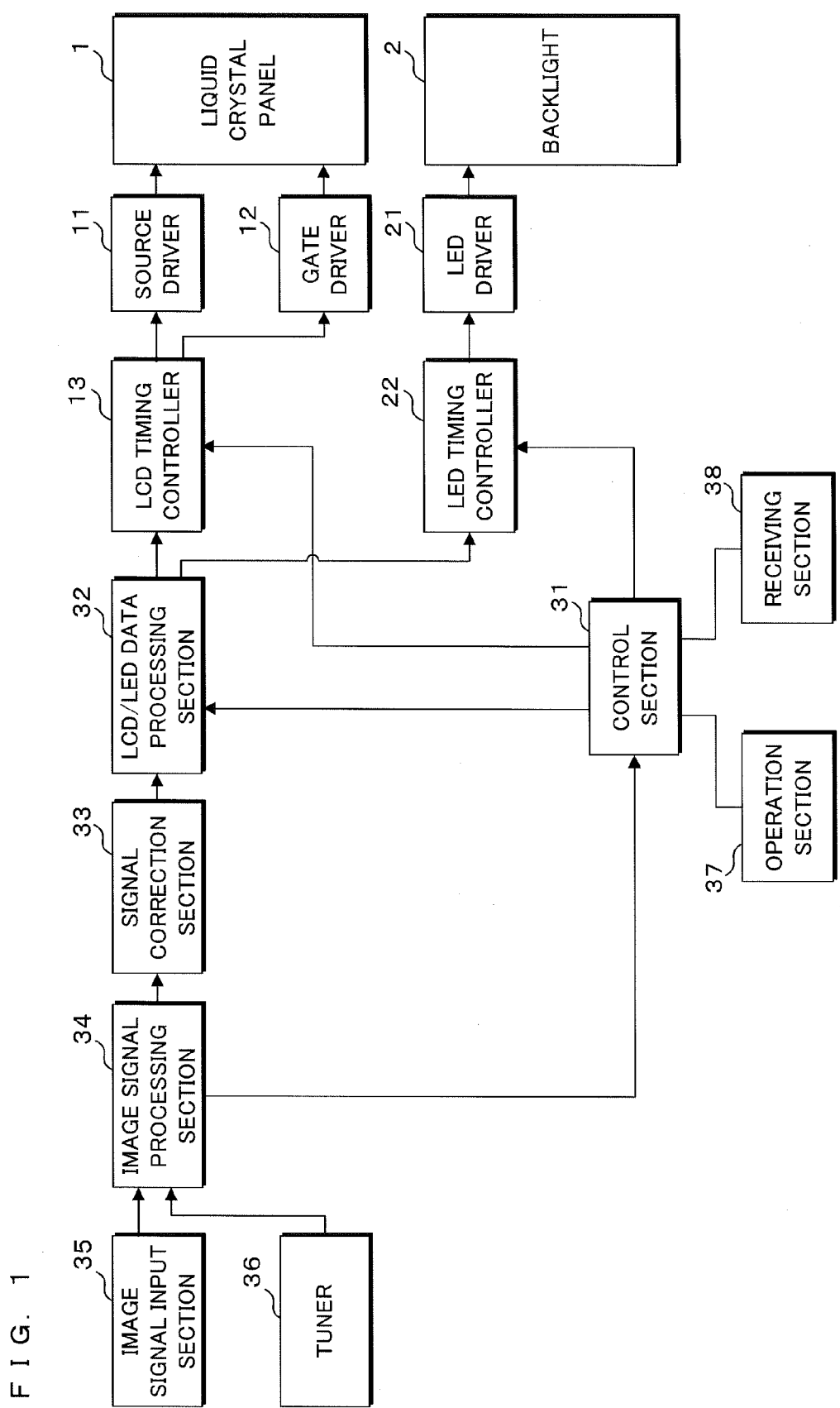
FIG. 1 is a block diagram illustrating an electrical functional configuration of a display device.

FIG. 1 is a block diagram illustrating an electrical functional configuration of a display device. The display device is used as a television receiver or a display. The display device is provided with a rectangular liquid crystal panel 1 and a direct-type backlight 2. The backlight 2 is arranged on the back side of the liquid crystal panel 1 with its light emitting face directing to the liquid crystal panel 1 to illuminate the liquid crystal panel 1 from the back side thereof. The backlight 2 has a plurality of LEDs arranged in a matrix form on the back side of the liquid crystal panel 1. The display device can individually adjust brightness of a plurality of regions, which an image displayed on the liquid crystal panel 1 is divided into, by mean of local dimming by individually controlling the luminance of the LEDs included in the backlight 2. Here, light sources other than an LED such as an optical fiber or the like may be used in the backlight 2.

A source driver 11 and a gate driver 12 for driving liquid crystal are connected to the liquid crystal panel 1. The source driver 11 and the gate driver 12 are connected to an LCD timing controller 13 for controlling the timing to drive liquid crystal. An LED driver 21 for operating each LED in the backlight 2 is connected to the backlight 2. The LED driver 21 is connected to an LED timing controller 22 for controlling the timing to operate the LEDs.

The display device has: an image signal input section 35 to which image signals are input from the outside via various types of interfaces; and a tuner 36 for receiving television broadcasting wave to generate image signals. Here, the display device may be the form of not having the tuner 36. The image signal input section 35 and the tuner 36 are connected to an image signal processing section 34 to input image signals to the image signal processing section 34. The image signal processing section 34 performs signal processing such as converting image size or superimposing characters to the image signals. The image signal processing section 34 is connected to a color signal correction section 33 to input the image signals to the color signal correction section 33. The color signal correction section 33 performs the processing of adjusting image quality such as saturation adjustment, sharpness adjustment, or the like on the image signals. The color signal correction section 33 is connected to LCD/LED data processing section 32 to input the image signals to the LCD/LED data processing section 32. The LCD timing controller 13 and the LED timing controller 22 are connected to the LCD/LED data processing section 32. The LCD/LED data processing section 32 generates display data for operating the liquid crystal panel 1 and lighting data for operating the backlight 2 from the image signals, and inputs the display data to the LCD timing controller 13 and the lighting data to the LED timing controller 22. The LCD timing controller 13 controls the timing to drive liquid crystal based on the display data. The LED timing controller 22 controls the timing to operate the LEDs based on the lighting data.

Moreover, the display device has a control section 31 for controlling each section. The control section 31 is configured by including, for example, a CPU. An operation section 37 for receiving operations from a user and a receiving section 38 for receiving control signals from a remote controller (not shown) are connected to the control section 31. Here, the display device may have a form of not including the receiving section 38.

A plurality of the LEDs arranged in a matrix form in the backlight 2 are divided into a plurality of control areas luminance of which can be individually adjusted. Either only one LED or a plurality of LEDs may be included in one control area. An image displayed by the liquid crystal panel 1 is divided into a plurality of regions which are illuminated by a plurality of control areas included in the backlight 2. FIG. 2 is a schematic diagram illustrating a plurality of regions into which an image is divided. In FIG. 2, boundaries of the regions included in a rectangular image are indicated by dashed lines. Each region in the image corresponds to respective control areas of the backlight 2 in one-to-one. In the liquid crystal panel 1, the parts that are illuminated by the control areas of the backlight 2 corresponding to the regions in the image display the respective regions in the image. For example, in a case where the backlight 2 is divided into 16×8 control areas and the liquid crystal panel 1 displays the image having 1920×1080 pixels, each region in the image has 120× 135 pixels. Local dimming for individually adjusting brightness of each region in the image is achieved by individually controlling the luminance of the control areas of the backlight 2.

The local dimming processing is performed in the LCD/ LED data processing section 32. The LCD/LED data processing section 32 individually determines the luminance of each control area in the backlight 2. For example, the LCD/LED data processing section 32 finds the maximum brightness among the pixels of each region in the image, and determines the luminance value of each control area so that the found brightness can be obtained. The LCD/LED data processing section 32 adjusts the luminance of the backlight 2 by inputting the determined luminance value of each control area to the LED timing controller 22. Also, the LCD/LED data processing section 32 calculates a luminance distribution of the backlight 2 in which the luminance of each control area in the backlight 2 is converted to have the same resolution as that of the liquid crystal panel 1. In addition, the LCD/LED data processing section 32 performs gamma correction on the image signals. Furthermore, the LCD/LED data processing section 32 performs the processing of generating the display data for operating the liquid crystal panel 1 to display the image on the liquid crystal panel 1 based on the image signals after the gamma correction and the luminance distribution of the backlight 2.

Figure 3:
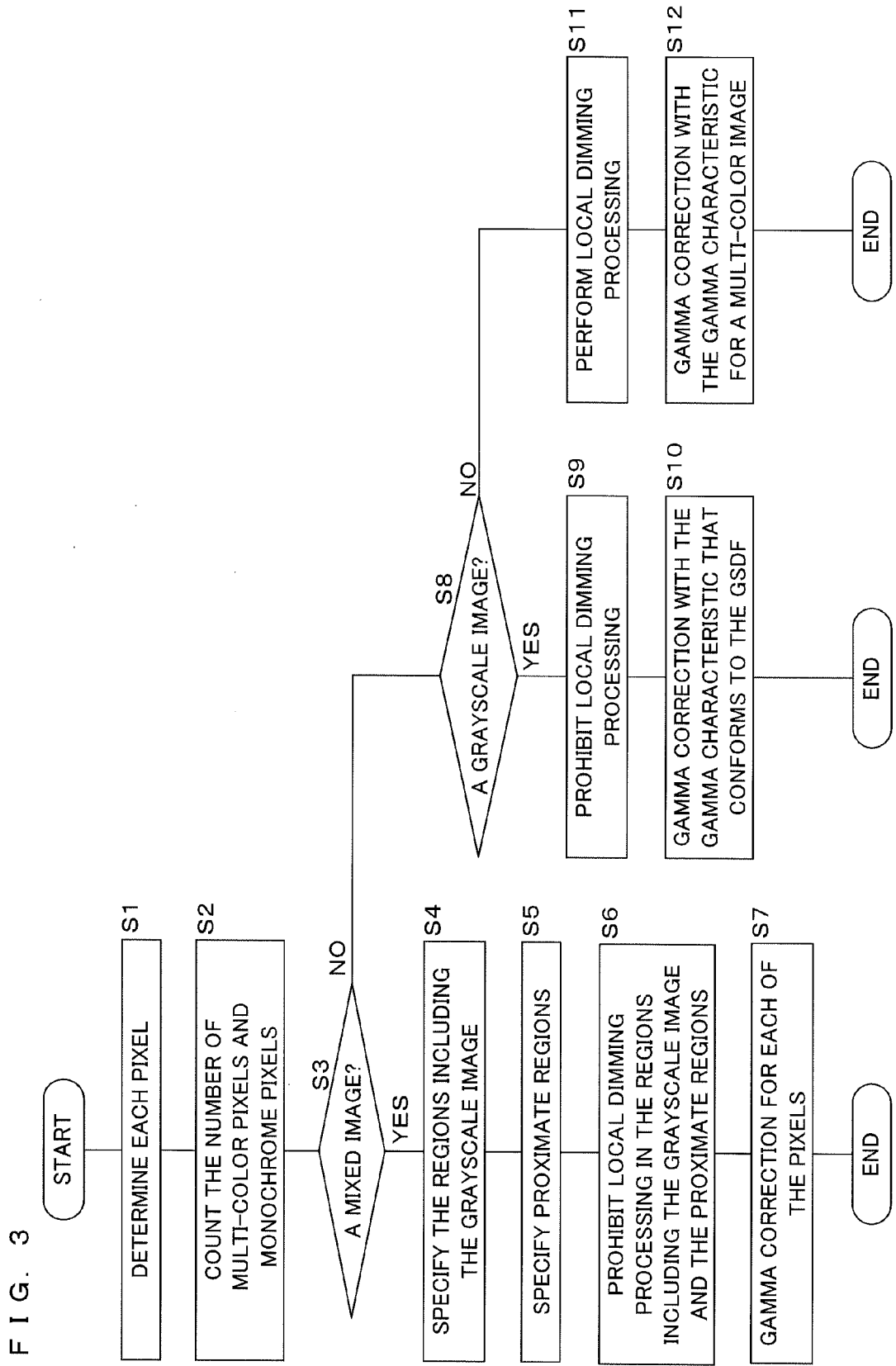
FIG. 3 is a flowchart illustrating a processing procedure to be performed by the display device of the present invention.

FIG. 3 is a flowchart illustrating a processing procedure to be performed by the display device of the present invention. The image signal processing section 34 determines whether each pixel included in the image is a multi-color pixel (color pixel) or a monochrome pixel (black-and-white pixel) with respect to the input image signals (step S1). In step S1, the image signal processing section 34 calculates a difference between the maximum value and the minimum value of RGB (R:Red; G:Green; B:Blue) signals of each pixel, and makes a determination by comparing the difference and a predetermined threshold. Where the maximum value of RGB signal is denoted by max (R, G, B), the minimum value of RGB signal is denoted by min (R, G, B), and the threshold is denoted by THa, the image signal processing section 34 determines that a pixel is a multi-color pixel when max (R, G, B)−min (R, G, B)≥THa. Also, the image signal processing section 34 determines that a pixel is a monochrome pixel when max (R, G, B)−min (R, G, B)<THa. The value of the threshold THa is so determined that the RGB signals can be detected as one same value in a monochrome pixel, and is prestored in the image signal processing section 34. For example, THa=20 in a case where each value of RGB is represented by eight bits. In step S1, the image signal processing section 34 may also make the determination by calculating the absolute value of the difference between RGB signals and comparing it with the threshold. Moreover, the image signal processing section 34 may make a determination of the pixels by a known method other than the ones described above.

Next, the image signal processing section 34 individually counts the number of multi-color pixels and monochrome pixels included in the image (step S2). The image signal processing section 34 then determines whether or not the image represented by the image signals is a mixed image of a multi-color image (color image) and a grayscale image (an image configured of a multi-color image and a grayscale image) (step S3). In step S3, the image signal processing section 34 calculates the ratio of the number of the multi-color pixels and the monochrome pixels to the total number of pixels respectively, and then compares the result with a predetermined first threshold. The first threshold is set to a value smaller than 50% of the total number of pixels, and prestored in the image signal processing section 34. The first threshold is, for example, 25%. In a case where both the ratio of the number of the multi-color pixels to the total number of pixels and the ratio of the number of the monochrome pixels to the total number of pixels are not less than the first threshold, the image signal processing section 34 determines that the image is a mixed image. When either of these ratios is less than the first threshold, the image signal processing section 34 determines that the image is not a mixed image.

In a case where the image is a mixed image (step S3: YES), the image signal processing section 34 specifies the area of the grayscale image in the image, and specifies the regions including the grayscale image among a plurality of regions corresponding to the control areas of the backlight 2 (step S4). In step S4, the image signal processing section 34, first, compares the number of the multi-color pixels with the number of the monochrome pixels in the image. In a case where the number of the multi-color pixels in the image is not less than the number of the monochrome pixels in the image, the image signal processing section 34 then specifies the area of the grayscale image in the image. The image signal processing section 34 extracts the portion where monochromatic blocks of continuous monochrome pixels in the x-axial direction are continuous in the y-axial direction, and calculates the variance of the x-coordinate at the left end of the extracted portion and the variance of the x-coordinate at the right end of the extracted portion. In a case where the calculated variance values are not more than a predetermined second threshold, it is determined that the monochromatic blocks are rectangular and within the area of the grayscale image in the image. Also, the image signal processing section 34 calculates the difference between the mean value of the x-coordinates for the left end of the monochromatic blocks and the x-coordinates for the left end of each monochromatic block, excludes the coordinates where the difference is not less than a predetermined third threshold, and determines the leftmost x-coordinate as the left side boundary of the area of the grayscale image. In a similar way, the image signal processing section 34 determines the right side boundary of the area of the grayscale image and specifies the area of the grayscale image. Here, more than one areas may be specified. In a case where the calculated variance value is more than the second threshold, the image signal processing section 34 determines the individual monochromatic blocks to be in the area of the grayscale image. In a case where the number of the multi-color pixels is less than the number of the monochrome pixels in the image, the image signal processing section 34 specifies the area of the multi-color image in a similar manner, and determines the areas other than the areas of the multi-color image to be the areas of the grayscale image. The image signal processing section 34 then specifies the regions including the grayscale image among the regions corresponding to the control areas of the backlight 2 in the image. Here, the image signal processing section 34 may specify the regions including the grayscale image in other ways. Also, the image signal processing section 34 may specify the regions with a shape other than a rectangle.

FIG. 4 is a schematic diagram illustrating an example of an area 41 of a grayscale image. In FIG. 4, an example in which only one area 41 of a rectangular grayscale image exists in a mixed image is illustrated. FIG. 5 is a schematic diagram illustrating an example of regions 42 including the grayscale image. In FIG. 5, a boundary of the area 41 of the grayscale image is illustrated by a solid line. Since the boundary of the area 41 of the grayscale image does not normally conform to the boundaries of each region, the area of a plurality of the regions 42 including the grayscale image is larger than the area 41 of the grayscale image.

The image signal processing section 34 then specifies proximate (neighbor) regions that are located within a predetermined range from the regions 42 including the grayscale image among the regions corresponding to the control areas of the backlight 2 (step S5). For example, the image signal processing section 34 specifies the regions adjoining to the regions 42 including the grayscale image among the regions not including the grayscale image as the proximate regions. FIG. 6 is a schematic diagram illustrating an example of the proximate regions 43. The proximate regions 43 exist around the regions 42 including the grayscale image. Here, the image signal processing section 34 may specify an area of the regions larger than the regions adjoining to the regions 42 as the proximate regions 43 that are located within a predetermined range from the regions 42 including the grayscale image.

The image signal processing section 34 then inputs the data indicating the regions 42 including the specified grayscale image and the proximate regions 43 to the control section 31. The control section 31 performs the processing of causing the LCD/LED data processing section 32 to prohibit local dimming processing in the regions 42 including the grayscale image and the proximate regions 43 (step S6). In step S6, the control section 31 inputs the data indicating the regions 42 including the grayscale image and the proximate regions 43 to the LCD/LED data processing section 32. The LCD/LED data processing section 32 adjusts the luminance in the control areas in the backlight 2 corresponding to the regions 42 including the grayscale image and the proximate regions 43 to a predetermined constant luminance. Accordingly, the portion that displays the regions 42 including the grayscale image and the proximate regions 43 in the image in the liquid crystal panel 1 is illuminated by the backlight 2 at uniform luminance. On the other hand, the LCD/LED data processing section 32 executes the local dimming processing to the regions other than the regions 42 including the grayscale image and the proximate regions 43 among a plurality of regions in the image.

The LCD/LED data processing section 32 then performs gamma correction on the input image signals for each of the pixels (step S7). More specifically, gamma correction is performed on the multi-color pixel with a predetermined gamma characteristic for a multi-color image, and on the monochrome pixel with a predetermined gamma characteristic for a grayscale image. A gamma characteristic for a multi-color image is the gamma characteristic of, for example, $\gamma=2.2$. The gamma characteristic for a grayscale image is the gamma characteristic that conforms to the GSDF (Grayscale Standard Display Function) defined in the DICOM (Digital Imaging and Communication in Medicine) standards. The DICOM standards define the formats and the communication protocol for medical images such as X-ray photographs. The GSDF is defined such that the contrast included in medical images can be expressed with high precision.

FIG. 7 is a characteristic chart schematically illustrating an example of the gamma characteristic. In FIG. 7, the horizontal axis represents an input of the image signals and the vertical axis represents brightness of the pixel to be displayed. In FIG. 7, the gamma characteristic of $\gamma=2.2$ is represented by a solid line, and the gamma characteristic that conforms to the GSDF is represented by a broken line. Compared with a gamma characteristic of $\gamma=2.2$, the gamma characteristic that conforms to the GSDF is defined such that the brightness change would be smaller as the brightness of an image becomes lower, and the brightness change would be larger as the brightness of an image becomes higher. For this reason, the contrast in a dark part would be expressed with higher precision and the contrast in a bright part is more enhanced in a grayscale image compared with a multi-color image.

The LCD/LED data processing section 32 then performs the processing necessary for displaying the image on the image signals after the gamma correction to display the mixed image. The display device completes the processing here.

If the image is not a mixed image in step S3 (step S3: NO), the image signal processing section 34 determines whether or not the image represented by the image signals is a grayscale image (step S8). In step S8, in a case where the ratio of the number of the monochrome pixels to the total number of pixels is not less than the first threshold and the ratio of the number of the multi-color pixels to the total number of pixels is less than the first threshold, the image signal processing section 34 determines that the image is a grayscale image. Moreover, in a case where the ratio of the number of the multi-color pixels to the total number of pixels is not less than the first threshold and the ratio of the number of the monochrome pixels to the total number of pixels is less than the first threshold, the image signal processing section 34 determines that the image is a multi-color image.

If the image is a grayscale image (step S8:YES), the image signal processing section 34 inputs the data that indicates the image is a grayscale image to the control section 31, and the control section 31 performs the processing of prohibiting the LCD/LED data processing section 32 from local dimming (step S9). In step S9, the LCD/LED data processing section 32 adjusts the luminance of all control areas in the backlight 2 to a predetermined luminance without performing the local dimming processing. The liquid crystal panel 1 is therefore illuminated by the backlight 2 at uniform luminance. The LCD/LED data processing section 32 then performs gamma correction on the input image signals with the gamma characteristic that conforms to the GSDF (step S10). The LCD/LED data processing section 32 then performs the processing necessary for displaying the image to the image signals after the gamma correction to display the grayscale image. The display device completes the processing here.

In a case where the image is a multi-color image in step S8 (step S8:NO), the image signal processing section 34 inputs the data indicating that the image is a multi-color image, and the control section 31 performs the processing of making the LCD/LED data processing section 32 execute local dimming (step S11). In step S11, the LCD/LED data processing section 32 performs the processing of individually determining the luminance in each control area in the backlight 2 depending on the image signals in order to execute local dimming. The LCD/LED data processing section 32 then performs the gamma correction on the input image signals with the gamma characteristic for a multi-color image (step S12). The LCD/LED data processing section 32 then performs the processing necessary for displaying the image on the image signals after the gamma correction to display the multi-color image. The display device completes the processing here.

It is noted that, in steps S6, S9 and S11, the display device may perform the processing of determining whether to prohibit or execute local dimming by displaying a selection screen for a user to select between the prohibition and the execution of the local dimming and make the user operate the operation section 37 or a remote controller. The display device that performs such processing enables a user to determine the image quality by selecting between the prohibition and the execution of local dimming by himself/herself.

As described above, in the present embodiment, the display device executes local dimming in the case of displaying a multi-color image and does not execute local dimming in a case of displaying a grayscale image. Being displayed without the execution of local dimming, a grayscale image can be displayed at high tone reproduction without deterioration of the image quality due to halo caused by performing local dimming. In particular, medical images are displayed at high tone reproduction and accurate diagnosis based on the images can be made. On the other hand, in the case where multi-color images are displayed, local dimming is executed, and thereby multi-color images are displayed at high contrast. Also, electric power saving is allowed by performing local dimming.

Moreover, in the case of displaying the mixed image of a multi-color image and a grayscale image, the display device does not execute local dimming in the regions including the grayscale image in the mixed image. Since the grayscale image in the mixed image is displayed without the execution of local dimming, the grayscale image is displayed at high tone reproduction even though the multi-color images and the grayscale images are mixed.

Also, the display device does not execute local dimming in the proximate regions that are proximal to the regions including the grayscale image in the mixed image. Light from each control area of the backlight 2 not only illuminates the regions corresponding to each control area, but also leaks to the surrounding regions. Therefore, even though local dimming is not executed in the regions including the grayscale image, halo may occur in the grayscale image due to the light leaking from the proximate regions when local dimming is executed in the proximate regions. By not executing local dimming in the proximate regions, it would be harder for halo to occur, and thereby the grayscale image is displayed at high tone reproduction.

Also, the display device performs gamma correction on a grayscale image with the gamma characteristic that conforms to the GSDF, and performs gamma correction on a multi-color image with the gamma characteristic for multi-color images. While the display device can display multi-color images at a tone reproduction suited for a multi-color image with high contrast, it can display grayscale images for medical use such as X-ray photographs with higher precision. This enables the display device to be used for accurate medical diagnosis.

Although the present embodiment describes the form in which each of the control section 31, the LCD/LED processing section 32, the color signal correction section 33 and the image signal processing section 34 is an individual and independent hardware, the display device may have a form of executing the processing to be performed by these processing circuits by other methods. For example, the display device may have a DSP (Digital Signal Processor) to execute the processing to be performed by the control section 31, the LCD/LED data processing section 32, the color signal correction section 33 and the image signal processing section 34 by means of software processing in the DSP. Also, the display device may have a hardware in which all the functions of the control section 31, the LCD/LED data processing section 32, the color signal correction section 33 and the image signal processing section 34 are integrated.

Additionally, the display device is not limited to the form of displaying medical images as grayscale images, but may be a form of displaying grayscale images other than medical images, such as radiolucent pictures of any objects, monochrome movie films, monochrome pictures, and the like.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A display device capable of displaying a color image and a grayscale image, comprising:
   an adjusting unit configured to adjust brightness of each of a plurality of regions of an image by performing local dimming; and
   a first determining unit configured to determine whether an image to be displayed is a color image or a grayscale image,
   wherein the adjusting unit adjusts brightness of the image by performing local dimming in a case where the first determining unit determines that the image to be displayed is a color image, and does not adjust brightness of the image by performing local dimming in a case where the first determining unit determines that the image to be displayed is a grayscale image.

2. The display device according to claim 1, further comprising:
   a second determining unit configured to determine whether or not the image to be displayed is a mixed image of a color image and a grayscale image; and
   a first specifying unit configured to specify a region including the grayscale image among the plurality of regions in a case where the second determining unit determines that the image to be displayed is the mixed image,
   wherein the adjusting unit does not adjust brightness of the region specified by the first specifying unit by performing local dimming.

3. The display device according to claim 2, further comprising
   a second specifying unit configured to specify, among regions not including the grayscale image, a region located within a predetermined range from the region including the grayscale image,
   wherein the adjusting unit does not adjust brightness of the region specified by the second specifying unit by performing local dimming.

4. The display device according to claim 3, further comprising:
   a first gamma correction unit configured to perform gamma correction on the color image with a predetermined gamma characteristic for a color image; and
   a second gamma correction unit configured to perform gamma correction on the grayscale image with a gamma characteristic that conforms to the Grayscale Standard Display Function defined in the DICOM standards.

5. The display device according to claim 3, further comprising
   a third gamma correction unit configured to perform gamma correction on color pixels included in the mixed image with a predetermined gamma characteristic for a color image, and to perform gamma correction on monochrome pixels included in the mixed image with a gamma characteristic that conforms to the Grayscale Standard Display Function defined in the DICOM standards.

6. The display device according to claim 2, further comprising:
   a first gamma correction unit configured to perform gamma correction on the color image with a predetermined gamma characteristic for a color image; and
   a second gamma correction unit configured to perform gamma correction on the grayscale image with a gamma characteristic that conforms to the Grayscale Standard Display Function defined in the DICOM standards.

7. The display device according to claim 2, further comprising
   a third gamma correction unit configured to perform gamma correction on color pixels included in the mixed image with a predetermined gamma characteristic for a color image, and to perform gamma correction on monochrome pixels included in the mixed image with a gamma characteristic that conforms to the Grayscale Standard Display Function defined in the DICOM standards.

8. The display device according to claim 1, further comprising:

a first gamma correction unit configured to perform gamma correction on the color image with a predetermined gamma characteristic for a color image; and a second gamma correction unit configured to perform gamma correction on the grayscale image with a gamma characteristic that conforms to the Grayscale Standard Display Function defined in the DICOM standards.

9. A television receiver, comprising:

the display device according to claim 1; and a tuner receiving a television broadcast, wherein the display device displays an image based on the television broadcast received by the tuner.

* * * * *